Dec. 27, 1955 W. M. ROSS 2,728,900

PULSE TIMING AND RECEIVER AUTOMATIC GAIN CONTROL IN PULSED OBJECT-LOCATING SYSTEMS

Original Filed Aug. 3, 1948 2 Sheets-Sheet 1

INVENTOR.
WAYNE M. ROSS
BY
Reynolds, Beach & Christensen
ATTORNEYS

Dec. 27, 1955 W. M. ROSS 2,728,900

PULSE TIMING AND RECEIVER AUTOMATIC GAIN CONTROL IN PULSED OBJECT-LOCATING SYSTEMS

Original Filed Aug. 3, 1948 2 Sheets-Sheet 2

INVENTOR.
WAYNE M. ROSS
BY
Reynolds, Beach & Christensen
ATTORNEYS

United States Patent Office 2,728,900

Patented Dec. 27, 1955

2,728,900

PULSE TIMING AND RECEIVER AUTOMATIC GAIN CONTROL IN PULSED OBJECT-LOCATING SYSTEMS

Wayne M. Ross, Seattle, Wash., assignor to Minneapolis-Honeywell Regulator Company, Minneapolis, Minn., a corporation of Delaware Original application August 3, 1948, Serial No. 42,239, now Patent No. 2,599,586, dated June 10, 1952. Divided and this application February 16, 1952, Serial No. 271,963

3 Claims. (Cl. 340—3)

This invention relates to pulse-operated transmission-reception systems and more particularly concerns an improved electrical circuit arrangement for generating a transmitter pulse timing wave and, in addition, a receiver automatic gain control wave used to vary the receiver sensitivity or gain during each reception interval between successive transmitted pulses in systems of that general type. The present patent application is a division of my earlier-filed copending application Serial No. 42,239, filed August 3, 1948, now Patent No. 2,599,586, dated June 10, 1952, and entitled Marine Depth Finder. The invention of present concern is herein illustratively described by reference to the preferred form thereof as applied to the ultrasonic marine depth finder disclosed in the above-cited patent application and as depicted in the accompanying drawings forming a part of the present specification. However, it should be understood that certain details, variations and modifications of the illustrated form may be made without departing from the underlying essentials involved and without exceeding the scope of the appended claims directed thereto.

A pulsed object-locating system such as the ultrasonic marine depth finder referred to above employs a timing oscillator from which trigger impulses are generated for pulsing the system transmitter at the desired repetition rate. In addition, it is desirable in such systems to provide a receiver automatic cyclic gain control operable to vary the receiver gain progressively during the reception interval between transmitted pulses so that receiver output signals caused by reflection of transmitted pulse energy from distant objects are substantially as strong as those caused by similar reflecting objects in the more immediate vicinity of the system. It is obvious, of course, that an automatic gain control voltage wave accomplishing this result must be generated synchronously with the trigger impulses controlling operation of the transmitter. Conventionally, in radar systems, underwater ultrasonic locating systems, and the like, a timing oscillator is provided from which trigger impulses are generated for actuating the transmitter modulator and for actuating a separate automatic gain control wave generator. The circuit arrangements employed were more or less complex and expensive and added to the number of potential trouble points in the system.

An object of the present invention is a pulse-operated system of the type generally described having combined pulse timing and receiver automatic gain control means constituting a simpler, more reliable and more easily adjustable circuit arrangement than those previously known or used.

A related object is an improved combination receiver automatic gain control and transmitter pulse timing circuit wherein the receiver automatic gain control voltage wave is inherently synchronous with and in correct phase relation to the transmitter pulse timing wave in the system regardless of supply voltage variations and other disturbances which might impair operation of conventional systems.

Still another related object is an improved circuit arrangement of the type indicated, in which adjustment of the pulse timing oscillator also has the inherent effect of corresponding changing the length or duration of the receiver automatic gain control wave cycle to suit the changed length of the reception interval between successive transmitted pulses. More specifically, it is an object to achieve this effect without altering the gain control wave amplitude when pulse repetition rate is varied.

Described briefly in terms of its preferred form as herein illustrated, the improved circuit arrangement comprises a free-running relaxation oscillator serving as a sawtooth wave generator. This generator controls timing of the transmitted pulses, its sawtooth wave being applied to a pulse generating circuit preferably comprising an R.-C. differentiating circuit that converts the abrupt reversals of the sawtooth wave into sharp trigger impulses controlling modulation of the transmitting oscillator of the system. The sawtooth wave generated by the relaxation oscillator, however, is also used directly as a receiver automatic volume control voltage wave applied to a suitable gain control element or elements in the receiver amplifier circuits. Thus by appropriate selection of sawtooth wave slope the gain of the system receiver is varied cyclically at the desired rate to produce signals of approximately uniform intensity although representing echoes from similar reflecting objects at widely different distances from the system location. Moreover, simply by varying the time-constant of the relaxation oscillator not only will the pulse repetition rate of the system be varied, to enable selecting different operating ranges of the system, but the effective or average slope of the sawtooth automatic gain control wave will likewise be changed by the correct amount to suit the different pulse intervals selected. This is true because the upper and lower values of such wave do not depend upon the time-constant of the oscillator circuit.

Such an arrangement has the advantages of simplicity, compactness, low cost and trouble-free operation, suiting it particularly well for ultrasonic underwater detectors for fishing boats and other small vessels, for example. By having certain major parts or circuit combinations serve multiple duty, the invention reduces the number of potential trouble points and thereby increases the reliability of operations and simplifies maintenance problems in such systems.

The foregoing and other features, objects and advantages of the invention, including certain details relating to the preferred form thereof, will become more fully evident in the following description and by reference to the accompanying drawings.

Figure 1:
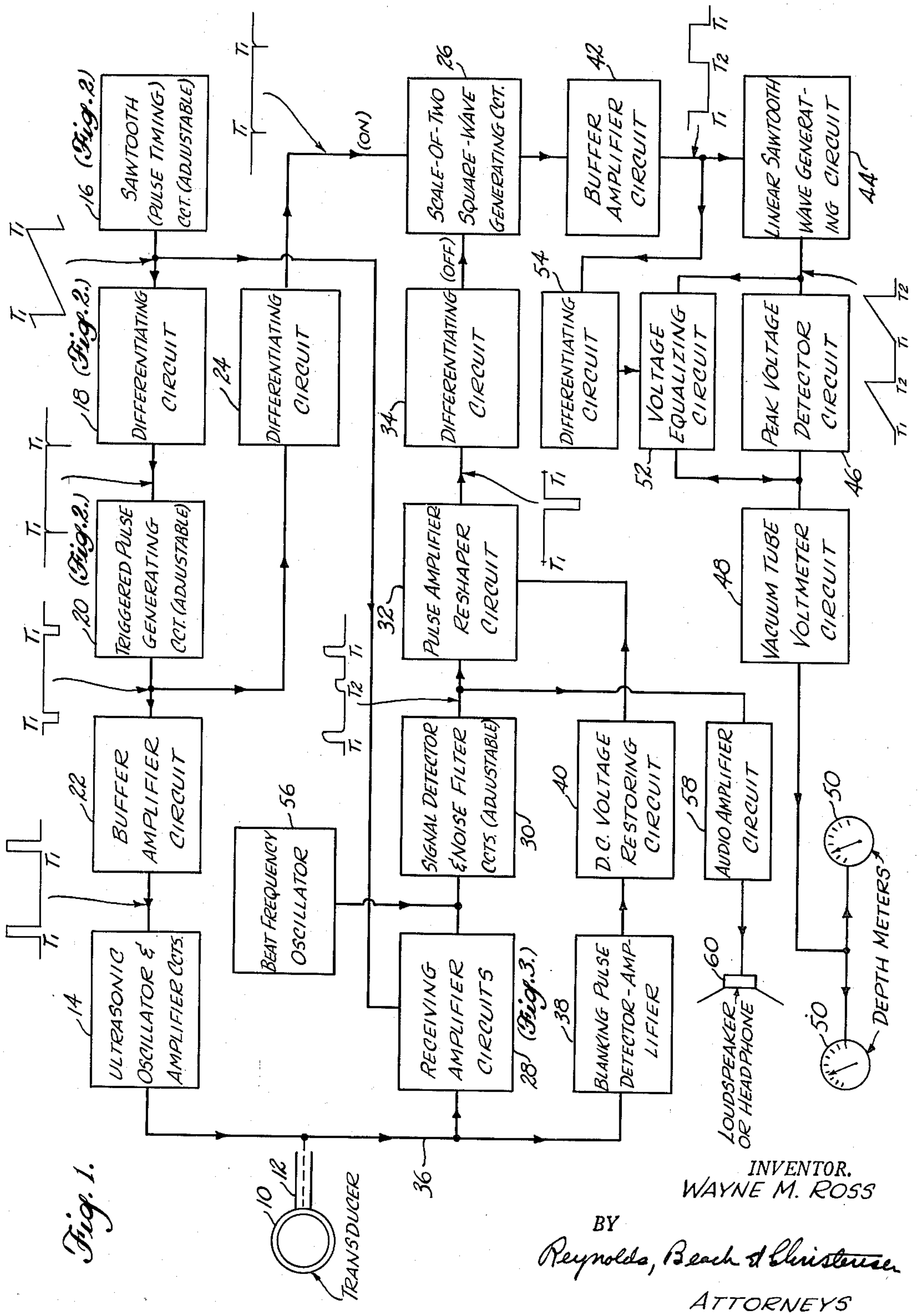
Figure 1 is a block diagram of the complete marine depth finder system in which the present invention is herein illustratively applied.

A more detailed disclosure of the marine depth finder system depicted in Figure 1 is given in my above-cited copending parent application. Sufficient description of that system is included in the present specification, however, to facilitate gaining an understanding of the improved circuit arrangement of present concern and the nature and purpose of its operation in the illustrative case.

In the figure, the ultrasonic transducer 10 may be of any conventional design adapted for installation at the bottom of a marine vessel. When the transducer is impressed with electric oscillations in the ultrasonic range, i. e., such as 25,000 cycles per second, ultrasonic energy is beamed toward the ocean bottom at the frequency of energization, and upon reflection at low energy level is converted by the transducer into an electric signal capable of amplification and utilization for the purposes described. Because the operating electronic circuits are to be located at a different position on the vessel, energizing ultrasonic impulses and received electric signals are conducted to and from the transducer through a shielded coaxial cable 12. Other features of the system disclosed in said earlier-filed copending patent application are being disclosed and claimed in companion patent applications filed of even date with the present application, one such companion application being entitled Receiver Blanking Circuit for Pulse Transmission-Reception Systems and the other, Detecting System.

The transmitting channel of the system includes the ultrasonic oscillator and amplifier circuits 14, preferably of conventional design, periodically pulsed by a suitable modulation system including the sawtooth wave generating circuit or oscillator 16 controlling pulse timing, the differentiating circuit 18 or its equivalent converting the sharp transient trailing ends of the sawtooth waves into sharp or peaked trigger impulses, the modulating-pulse generating circuit 20 triggered at the sawtooth wave frequency by the output of the differentiating circuit 18, and the buffer amplifier circuit 22 directly modulating the ultrasonic oscillator with the amplified pulses. The waveforms appearing at successive points in the transmitter channel are indicated in the figure, the symbol $T_1$ designating the start of each transmitted pulse. Circuits included in the blocks 14 and 22 are so conventional as to require no particular description or further illustration. Those represented by blocks 16, 18 and 20 may be of conventional form also.

The sawtooth wave timing circuit 16 is made adjustable to control pulse repetition frequency, and the triggered pulse generating circuit 20 is adjustable to control pulse length. Preferably longer pulses (15 milliseconds) are employed at the 200 fathom range and shorter pulses at shorter ranges, such as 10 millisecond pulses at 100 fathoms and 2.5 millisecond pulses at 20 fathoms. By varying the pulse length with range setting in this manner, maximum ratio of signal to noise in the system is more readily attainable by use of adjustable filter circuits in the receiving channel to filter out the random noise without seriously weakening the signal.

The faint electric signals produced in the transducer by the received echoes are amplified in circuits 28, and at resulting greater amplitude are applied to the circuits 30 comprising a signal detector and noise filter circuits. The detected signal impulses are then applied to the pulse amplifier and reshaper circuit 32 which increases their amplitude and restores a sharp or steep leading edge to the pulses partially removed by the process of detection and noise filtering. Such sharp leading edge of the detected pulse is further accentuated in point of time by the differentiating circuit 34 connected to trigger "off" the scale-of-two square wave generating circuit 26.

Modulating pulses generated by circuit 20 are likewise passed through a differentiating or peaking circuit 24 which converts the leading edges of each pulse to a sharp impulse of short duration. In this case the resulting sharp impulse is utilized to trigger "on" the square wave generating circuit. The scale-of-two circuit is sometimes referred to as a "flip-flop" circuit. Such a circuit is characterized by its initiation into one static state of operation by application of a first impulse to a control point, and of termination or return to its original state of operation by application to the same or a different control point in the circuit of a second impulse. The circuit is employed in the present instance to generate a voltage wave or pulse having steep leading and trailing edges coincident with the first and second applied pulses. Preferably the wave generated is of square or rectangular form, initiated with the transmitted pulse and terminated with the echo for each pulse cycle. The duration of this square wave therefore precisely equals the time of travel of ultrasonic energy from the vessel to and from the ocean bottom and constitutes a measure of ocean depth.

The square wave from the circuit 26 is utilized to measure and indicate ocean depth in the following manner. After passing through a buffer amplifier circuit 42, the square wave from circuit 26 is applied to a linear sawtooth generating circuit 44. The latter produces a linearly rising voltage commencing at time $T_1$ and terminating at time $T_2$ when the echo is received. Since this rise in voltage is linear the resulting peak amplitudes of the sawtooth voltage waves from circuit 44 become directly proportional to ocean depth, and are detected by a peak voltage detector circuit 46 to produce a steady output voltage which can be read on a galvanometer or other indicator. However, instead of applying the output of peak detector 46 directly to a galvanometer, which would impair the detecting characteristic of the circuit 46 by providing a low impedance discharge path for the storage condenser of the peak detector, this steady voltage is applied first to a vacuum tube volt meter circuit 48 which in turn operates indicating meters 50. A continuous depth indication is thereby produced automatically, accurately and in simple manner, and any number of galvanometers or other indicators may be provided at convenient points throughout the vessel without appreciably adding to the cost.

A triggered voltage equalizing circuit 52 cooperates with the peak voltage detector 46 to enable the latter to respond sensitively to changes in ocean depth no matter how rapid or in what sense they may occur. The voltage equalizing circuit is essentially a one-way switch, triggered or initiated into operation momentarily at time $T_2$, at the end of each sawtooth wave from circuit 44, by a sharp impulse from the differentiating circuit 54 which peaks the transient trailing end of the square wave produced by circuit 26. In a sense, this circuit "compares" at time $T_2$ the instantaneous peak amplitude of the sawtooth voltage with the existing voltage of the charge stored by the condenser in the peak voltage detector circuit 46. It will be evident that the latter is capable of gaining a higher voltage simply by the process of conduction of its detector means, adding charge to the condenser when ocean depth increases and the sawtooth wave peaks rise accordingly above their former value and the steady condenser voltage of the detector circuit. It is likewise important that the condenser retain its charge between sawtooth peaks if its voltage is to be sufficiently steady to prevent flicker of the indicator meters 50. The difficulty, therefore, lay in the condenser being unable to lose its charge sufficiently rapidly to maintain its voltage accurately representative of depth should the ocean depth suddenly decrease. The voltage equalizing circuit 52, which "compares" voltages, as mentioned, overcomes this difficulty by removing excess charge from the condenser, if necessary, in each pulse cycle to prevent discharge of the condenser from lagging behind a drop in sawtooth wave peak amplitudes. The arrangement thereby permits the use of a peak detector circuit with a high time-constant or filter-factor, capable of producing a steady and accurate meter deflection.

Still another feature of the disclosed system, as shown in the block diagram, resides in the provision of a beat frequency oscillator circuit 56 tuned to a frequency near that of the ultrasonic oscillator 14 to produce an audible beat note when mixed in the detector 30 with the received echo signal to permit listening to the signals received. The pulsating output signals from the detector 30 are amplified in the audio amplifier circuit 58 for application to a loud speaker 60 or headphones. From the nature of the audible signal tones thus produced the operator is enabled to recognize the presence of schools of fish in the water or the relative softness of the ocean bottom. The recurring sounds produced from the echo signals are more staccato or sharp when the reflecting ocean bottom is hard, and become slurred or legato with a soft ocean bottom. This enables identifying favorite fishing grounds, for example. The presence of a school of fish is heard as a periodic rushing sound of a duration determined by the depth of the school layer. The pulse repetition rate is set at approximately 50 cycles per minute when the apparatus is used for listening purposes. At this frequency it is also readily possible to listen for the lapsed time interval preceding return of ocean-bottom echoes at the greater depths up to 400 fathoms in the described case, when it may be that the automatic depth measuring or indicator circuits of a particular system are not designed or connected up for operation at such depths.

Another problem encountered results when the pulses of high intensity ultrasonic oscillations from the oscillator 14 enter the receiving circuits 28 over the same circuit conductor 36 as the faint received echo signals from the transducer, tending to overload the amplifier circuits. A simple addition to these circuits as described overcomes the difficulty with vacuum tube overload, but there remains the more serious problem of the transmitted pulse, at substantial intensity, passing through circuit stages 30, 32 and 34 and reaching the scale-of-two circuit 26. If allowed to reach the circuit 26 this pulse would arrive at an appreciable, though slight, time after the circuit is triggered "on" by the differentiating circuit 24, because of the inherent delay encountered in the receiver channel, and because of circuit transients and spurious echoes immediately following the transmitted pulse, and would tend to trigger "off" the circuit 26 at the wrong time, before reception of the echo, a condition obviously unfavorable. To completely avoid any such possibility I prefer to eliminate the transmitted pulse from the receiver channel at the stage of amplifier 32, by deriving at detector amplifier 38 a blanking pulse coexistent with or overlapping all portions of the transmitted pulse in the receiver, and applying it as a blocking bias to such amplifier. As indicated by the wave form shown in the figure, the transmitted pulse occurring at time $T_1$ and an echo signal at time $T_2$ arbitrarily chosen are both allowed to pass detector 30, however.

Following application of each blanking pulse, it is desirable to allow immediate recovery of circuit sensitivity. A D. C. restorer circuit 40 interposed between the detector amplifier circuit 38 and amplifier 32 performs this function.

It will be evident that echo signals are much stronger in shallow water than in deep water because of divergence or spread of the transmitted ultrasonic beam, which reduces the sound intensity impinging a unit area of the ocean bottom at greater depths, and also because of the divergence of the reflections. Ordinarily, therefore, the signals from shallows are much stronger than required to operate the sensitive electronic receiving circuits, while those from the greater depths may be so faint as to require maximum receiving sensitivity. It will then be immediately evident that a receiver which equally amplifies echo signals from all depths will tax the capacity of any measuring circuits to respond similarly to the signals which occur at the widely divergent intensities, a condition which is naturally undesirable. Moreover, when listening to the signal sounds it will be more difficult to recognize the identifying signal characteristics if this intensity variation is great. The problem is overcome in simple, effective manner by directly utilizing the sawtooth voltage waves already available from the sawtooth pulse timing circuit 16 and applying such waves as cyclic automatic volume control voltage to the receiving amplifier circuits 28, as indicated in Figure 1. Accordingly, the applied progressively rising sawtooth voltage occurring during each pulse cycle, commencing immediately with the transmission of a pulse and ending with the transmission of the succeeding pulse, progressively raises the gain of the receiver during that interval so that signals in shallow water are amplified less than signals in deep water, generally proportionately. Consequently, no manual control is necessary to adjust detected signal intensity throughout the full operating range of the apparatus, and even if sawtooth frequency is changed with range adjustment, the control is unchanged.

Figure 2:
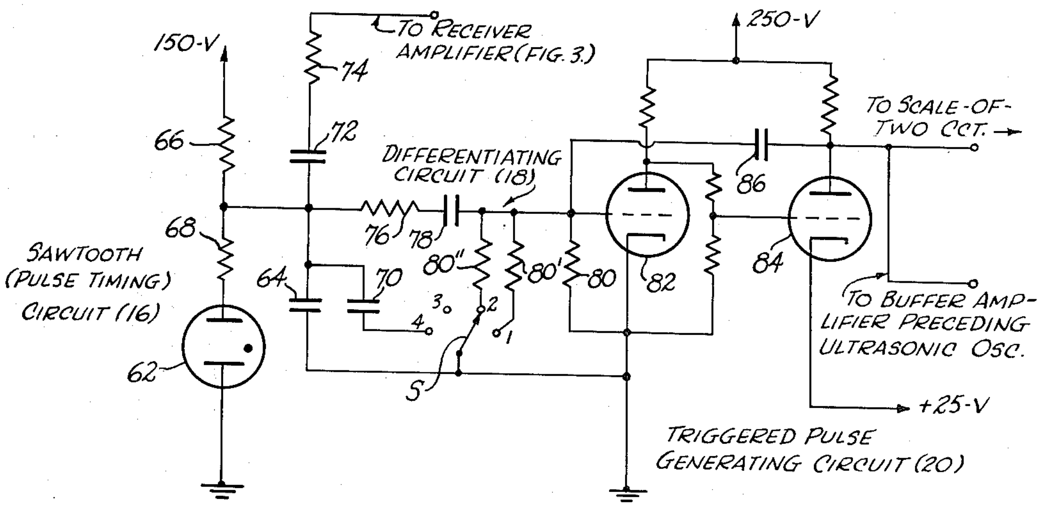
Figure 2 is a schematic circuit diagram of the relaxation oscillator and pulse generating circuit for operating the transmitter.

The preferred form of sawtooth wave generator for the illustrative application of the invention comprises the simple relaxation oscillator shown in Figure 2. This free-running oscillator comprises the neon tube 62, the storage condenser 64, the charging resistor 66 connected in series with the condenser and the 150 volt power supply terminals (not shown), and the current-limiting resistor 68 connected in series with the neon tube 62. In position 4 of switch S, storage condenser 70 is connected in parallel with condenser 64 to increase the capacitance of the oscillator circuit and thereby lower its frequency, such as from 100 cycles per minute normal frequency to 50 cycles per minute. When normal supply voltage is applied to the oscillator circuit, condenser 64 commences to charge at an approximately linear rate determined by the time constant of the charging circuit comprising resistor 66 and condenser 64, and also by the supply voltage. When the condenser voltage reaches the ionizing potential of the neon tube 62, the latter abruptly discharges condenser 64 through the resistor 68 which protects the neon tube against excessive discharge current therein. This action initiates termination of the sawtooth wave cycle so that a new cycle may commence as soon as the decreasing voltage being applied to the neon tube by the discharging condenser 64 drops below the minimum value necessary to sustain ionization in the neon tube, in the manner characteristic of relaxation oscillators. Thus a recurring sawtooth wave is generated by the circuit which corresponds in frequency to the desired repetition rate of the depth finder system, and this repetition rate may be increased or decreased by moving the switch S out of or into position 4.

In order to utilize this sawtooth wave effectively for triggering the system transmitter, the sawtooth wave voltage appearing in the oscillator circuit between resistors 66 and 68 is applied through the series-connected resistor 76 and coupling condenser 78 to the control grid of amplifier tube 82 which cooperates with tube 84 to constitute delayed multivibrator pulse generating circuit 20.

The condenser 78 and the grid leak resistor 80, and alternatively included, selectable, parallel resistors 80′ and 80″ (switch positions 1 and 2, respectively) constitute a differentiating circuit which converts the transient terminal portions of the recurring sawtooth waves into short negative impulses capable of triggering "off" the amplifier tube 82 of the pulse generating circuit to initiate the modulating pulse. For this purpose condenser 78 is chosen small (such as 500 micro-micro farads), and the resistors 80, 80′ and 80″ are large (such as 6 megohms, .5 megohms, and 10 megohms, respectively) the particular size of the resistors, however, being determined primarily by the desired length of pulse to be produced by the delayed multivibrator circuit in the various switch positions. The pulse-generating, delayed multivibrator circuit, including amplifier tubes 82 and 84, is of conventional design, capable of initiation by application of the trigger pulse to the control grid of the normally conducting tube 82. When thus momentarily cut off by this trigger pulse, tube 82 applies a positive potential to the control grid of tube 84 rendering the latter conductive. Tube 82 is then rendered further nonconductive, and the condition persists until, in the usual manner, a predetermined time later, fixed by the capacity of the condenser 86 and the particular resistance switched in the grid circuit of tube 82, the grid of tube 82 again becomes positive and the tube conducts. In the meantime the resulting negative output pulse, appearing at the anode of tube 84, initiates the scale-of-two pulse generating circuit, and also acts to overcome the negative bias suppressing oscillations in the ultrasonic oscillator, to render the latter operative and energize the transducer.

In accordance with the invention, the same sawtooth wave generated by the relaxation oscillator illustrated in Figure 2 is also applied as a cyclic automatic volume control wave to the system receiver for purposes previously described. Typical receiving amplifier stages of the double-tuned type, of which there may be any number in the receiver, depending upon the total receiver gain desired in the system, appear in Figure 3. The coupling circuit by which the sawtooth waves are applied to this receiver comprises (Figure 2) the D.-C. blocking condenser 72 and the series resistor 74.

With reference to the illustrated receiver amplifier stages, the received signal applied to the amplifier input terminal 88 passes through the coupling condenser 90 to the control grid of the first amplifier tube 92 having a tuned circuit 94 in its anode lead. By inductive coupling the tuned circuit 96 in the grid lead of the succeeding amplifier tube 98 is energized at amplified level for further amplification in the latter tube and coupling from the latter's tuned plate circuit 100 to the tuned circuit 102 in the grid lead of a succeeding amplifier tube (not shown). Double-tuned amplifiers of this type are generally conventional. However, certain simple additions have been made in the circuit and in its mode of operation to improve its utility for ultrasonic depth-finding, additionally to the present invention. The first improvement includes the addition in the grid-cathode circuit of the tube 98, for example, of the R.-C. circuit, including the resistor 106 and the condenser 104 connected between ground and that side of the tuned circuit 96 which is remote from the tube's control grid. By choosing this resistor and condenser of proper sizes (such as 500 micro-micro farads and 1 megohm, respectively) excessive plate current in tube 98 is prevented when the tube is overdriven, as during the transmitted pulse entering the receiver, by the process of grid-leak detection or self-biasing of the tube. Thus, following an exceedingly short initial surge of current through tube 98, during which condenser 104 is charged, plate current immediately assumes an allowable value compatible with the tube's normal capacity, as established by the negative bias developed by grid current flow in resistor 106. The weaker signal pulses do not cause grid current to flow, and no negative bias results during their application to the tube, which thus amplifies them fully. The condenser 104 is an ultrasonic by-pass, effectively connecting the tuned circuit 96 and the tube's cathode directly together for ultrasonic frequency currents, and thereby prevents any reduction in useful gain of the amplifier stage by the presence of the resistor 106.

Figure 3:
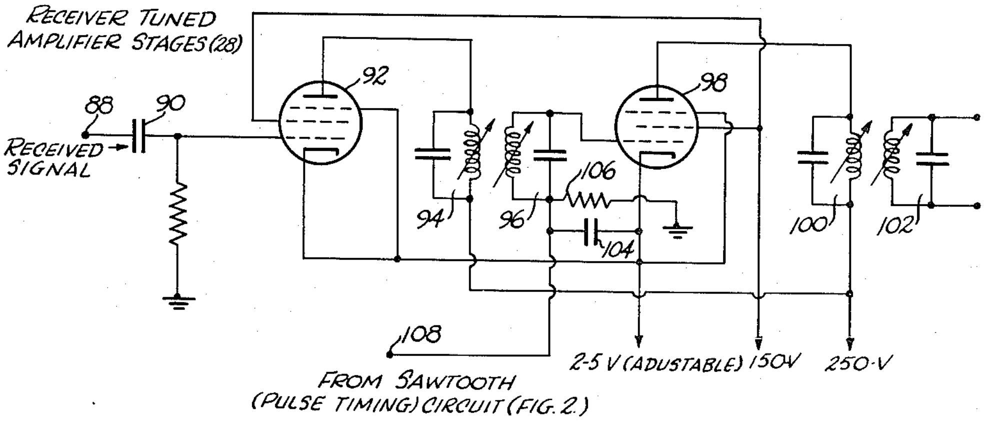
Figure 3 is a schematic circuit diagram of receiver amplifier stages, showing the manner of applying the sawtooth automatic gain control voltage wave produced by the relaxation oscillator in Figure 2.

The sawtooth wave voltage from the oscillator circuit shown in Figure 2 enters the receiver circuit shown in Figure 3 at terminal 108 and is applied to the grid of tube 98 for controlling the gain of the latter, so that the overall receiver gain increases approximately linearly during each reception interval between transmitted pulses, commencing at a suitably reduced initial value determined by circuit design. In order to isolate the sawtooth wave circuit from ultrasonic currents which might prevent neon tube 62 from extinguishing properly in the operation of the relaxation oscillator, the sawtooth wave is applied at the cathode side rather than the grid side of tuned circuit 96, and resistor 74 (Figure 2) is interposed between the sawtooth wave generator and the receiver circuit.

It will be noted that the movement of switch S (Figure 2) into and out of position 4 to change the repetition rate of the system does not appreciably vary the maximum and minimum values of the sawtooth voltage wave voltage applied as cyclic gain control voltage to the receiver amplifier circuits. This is true because the 150 volts supply voltage applied to the relaxation oscillator circuit remains constant, as do the firing characteristics of neon tube 62. Hence the gain of the receiver stage 98 is swept through the full desired range of variation which is the same at one pulse repetition rate as it is at a different rate. Consequently no other adjustments or compensatory adjustments are necessarily required when the repetition rate of the system is varied, insofar as the automatic cyclic gain control is concerned.

I claim as my invention:

1. In a pulse-operated transmission-reception system having a pulsed transmitter and a return-pulse receiver adapted to amplify echo signals from objects at different ranges from the system, said receiver having a gain control element therein responsive to changes of potential applied to said gain control element to vary the gain of said receiver, the combination of free-running sawtooth wave generator means, pulse-generating means cyclically triggered by said sawtooth wave generator means and operable thereby to pulse-modulate the system transmitter at the repetition rate established by said sawtooth wave generator means, and means applying sawtooth wave potential produced by said generator means to the receiver gain control element for progressively increasing the receiver gain from an initial value to a final value during substantially the entire period of time included in each of the intervals between successive transmitted pulses.

2. The combination defined in claim 1, wherein the pulse-generating means includes differentiating circuit means deriving a sharp trigger impulse from the decay portions of the respective sawtooth wave cycles.

3. The combination defined in claim 1, and means included in the sawtooth wave generator means operable to vary the frequency of the sawtooth wave generator means without materially changing the amplitude of the sawtooth wave produced thereby.

References Cited in the file of this patent

UNITED STATES PATENTS

| | | |
|---|---|---|
| 2,456,952 | Kluender | Dec. 21, 1948 |
| 2,498,381 | Smith | Feb. 21, 1950 |
| 2,502,938 | Fryklund | Apr. 4, 1950 |